(12) United States Patent
Burd et al.

(10) Patent No.: US 8,356,270 B2
(45) Date of Patent: Jan. 15, 2013

(54) INTERCONNECT AND TRANSISTOR RELIABILITY ANALYSIS FOR DEEP SUB-MICRON DESIGNS

(75) Inventors: Tom Burd, Fremont, CA (US); Yuri Apanovich, San Jose, CA (US); Srinivasaraghavan Krishnamoorthy, Mountain View, CA (US); Vishak Kumar Venkatraman, Santa Clara, CA (US); Anand Daga, Cupertino, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 151 days.

(21) Appl. No.: 12/907,316

(22) Filed: Oct. 19, 2010

(65) Prior Publication Data

US 2012/0096424 A1    Apr. 19, 2012

(51) Int. Cl.
*G06F 17/50* (2006.01)
(52) U.S. Cl. ..................................... 716/136
(58) Field of Classification Search .............. 716/51, 716/111, 112, 115, 133, 136
See application file for complete search history.

(56) References Cited

U.S. PATENT DOCUMENTS 6,249,898 B1    6/2001    Koh et al.
6,345,379 B1 *  2/2002    Khouja et al. ............ 716/115

OTHER PUBLICATIONS

Nagaraj, NS, et. al., "A Practical Approach to Static Signal Electromigration Analysis", Proc. Design Automation Conference, Jun. 1998.
Teng, C.C., et. al., "Hierarchical Electromigration Reliability Diagnosis for VLSI Interconnects", Proc. Design Automation Conference, Jun. 1996, pp. 752-757.
Oh, C., S., et al., "Static Electromigration Analysis for Signal Interconnects", Proc. Int. Symposium on Quality Electronic Design, 2003.
Kitchin, J., "Statistical Electromigration Budgeting for Reliable Design and Verification in a 300-MHz Processor," Proc. Symposium of VLSI Circuits, Jun. 1995, pp. 115-116.
Rzepka, S., et. al., "Characterization of Self-heating in Advanced VLSI Interconnect Lines Based on Thermal Finite Element Simulation", IEEE Trans. On Components, Packaging, and Manufacturing Technology, vol. 21, Issue 3, Sep. 1998, pp. 406-411.

* cited by examiner

*Primary Examiner* — Vuthe Siek
(74) *Attorney, Agent, or Firm* — Hamilton & Terrile, LLP; Stephen A. Terrile

(57) ABSTRACT

A system and method for providing a statistical budgeting approach to modeling reliability effects such as interconnect electromigration (EM), transistor time-dependant dielectric breakdown (TDDB), hot-carrier injection effects (HCI) and bias temperature instability (BTI) is disclosed. A static analysis flow captures the effects of design topology, switching constraints, interactions between signal nets and supply rails as well as thermal gradients due to interconnect and transistor self as well as mutual heating, and was used to verify successive iterations of deep sub-micron integrated circuit designs.

17 Claims, 8 Drawing Sheets

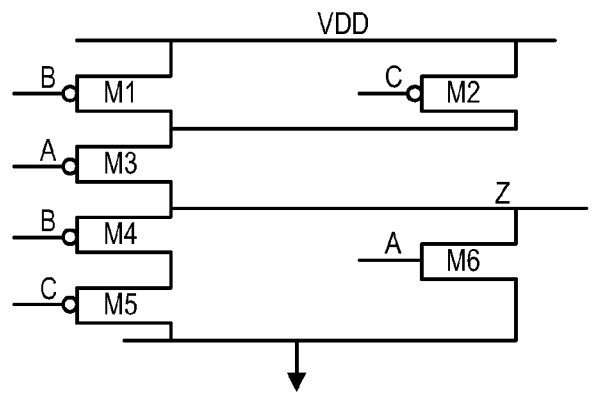
(a) 2-1 AO1 Gate
z = A & (B | C)
*Figure 3A*
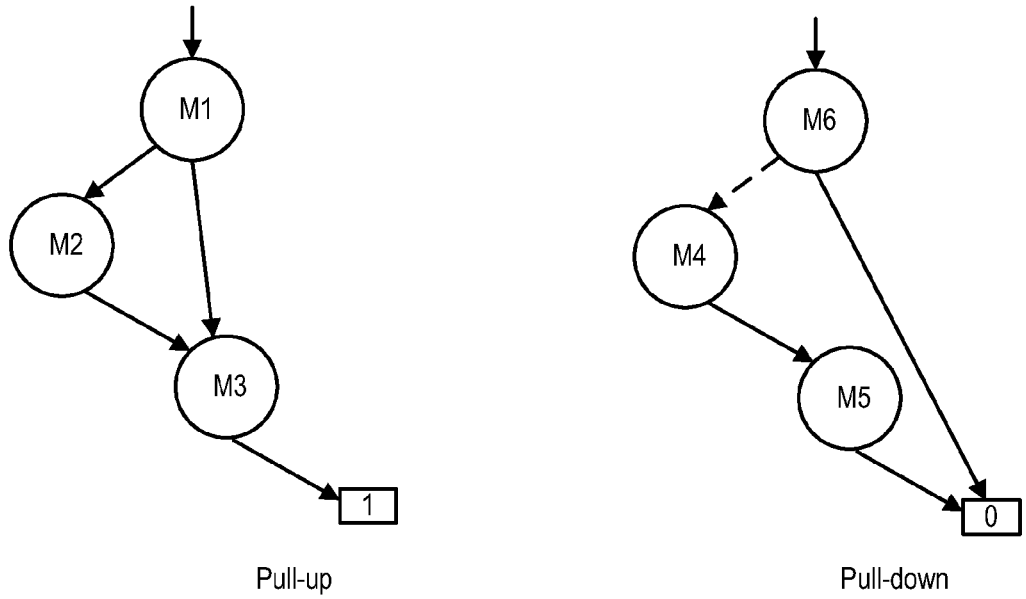
Pull-up        Pull-down
(b) DD for Pull-up and Pull-down paths
*Figure 3B*        *Figure 3C*

(b) DD for Constraint B = C
i.e. M1 and M2 toggle together (a) DD For 2-1 AO1
z = A & (B | C)

(c) 2-1 AO1 with B = C (a) DD For 2-1 AO1
z = A & (B | C)

| M1 | M2 | M3 | Z |
|----|----|----|---|
| 0  | 1  | 1  | 1 |
| 1  | 0  | 1  | 1 |
| 1  | 1  | 1  | 1 |

(b) Minterms for
Pull-Up Path

| M1 | M2 | M3 | Z |
|----|----|----|---|
| 0  | 1  | 1  | 1 |
| 1  | 0  | 1  | 1 |

(c) Minterms that maximize
currents through devices

INTERCONNECT AND TRANSISTOR RELIABILITY ANALYSIS FOR DEEP SUB-MICRON DESIGNS

BACKGROUND OF THE INVENTION

1. Field of the Invention

The present invention relates to reliability analysis for integrated circuit designs, and more particularly interconnect and transistor reliability analysis for deep sub-micron integrated circuit designs.

2. Description of the Related Art

In deep sub-micron designs, metal interconnects and transistors subject to ever increasing current densities and temperature can wear-out over a period of time causing chip-level failures. Electromigration is a known interconnect wear-out mechanism caused due to the movement of metal atoms under high current and thermal gradients. Time-dependant dielectric breakdown (TDDB) in transistors can occur due to continuous application of electric fields across the oxide layer often resulting in permanent circuit failure. Similarly, hot carrier injection (HCI) effects in transistors that affect carrier mobility are often caused due to carrier trapping inside the gate oxide or the $SiO_2$ layer, due to the continuous application of high drain to source bias. In addition, bias temperature instability (BTI) that manifests itself at high temperatures as shift in threshold voltage in transistors causes temporary timing failures in the design. Such failure mechanisms often place constraints on the DC current density that an interconnect line can support, or the maximum electric field that a transistor can support. In addition, Joule heating can reduce mean time to failure (MTTF) of interconnects and transistors, and can place constraints on the root mean squared (RMS) current density that an interconnect line or a transistor can support.

Accurately solving DC and RMS currents in each interconnect segment via circuit simulation can be a compute intensive-task for large integrated circuit (IC) designs. Known approaches have attempted to reduce the complexity of the analysis by filtering out from the analysis nets that drive small capacitance loads. In deep submicron designs, however, the ever increasing component density can cause thermal gradients to induce failures in unsuspecting nets adjacent to high current nets. Previous work has also demonstrated that a static linear analysis approach makes this a tractable problem, and produces results within acceptable error bounds.

SUMMARY OF EMBODIMENTS OF THE INVENTION

In accordance with an embodiment of the present invention, an impedance-based static analysis method to performing interconnect and transistor reliability analysis for deep sub-micron integrated circuit designs is set forth. The method accurately models current steering amongst multiple parallel charge/discharge paths encountered in circuit designs. In certain embodiments, the method further includes using decision diagrams to account for switching constraints, such as equivalence or exclusivity among nets, to correctly capture the current paths and densities. Computed currents are subsequently used to compute the power dissipated by the design elements. The power dissipated by the entire design is then computed by accounting for switching constraints such as one-hot, where only a single net out of a collection of nets is high at any given time.

More specifically, in one embodiment, a method for performing an interconnect and transistor reliability analysis is described. The method includes modeling current steering amongst multiple parallel charge/discharge paths encountered in an integrated circuit design; using decision diagrams to account for switching constraints to correctly capture current paths and densities; computing currents to determine power dissipated by design elements contained within the integrated circuit design; and, performing a statistical interconnect and transistor reliability analysis based upon the current modeling and a thermal map of the design.

In another embodiment, an apparatus comprising a processor and memory coupled to the processor is described. The memory includes a system for performing an interconnect and transistor reliability analysis. The apparatus includes instructions executable by the processor for: modeling current steering amongst multiple parallel charge/discharge paths encountered in an integrated circuit design; using decision diagrams to account for switching constraints to correctly capture current paths and densities; computing currents to determine power dissipated by design elements contained within the integrated circuit design; and, performing a statistical interconnect and transistor reliability analysis based upon the current modeling and a thermal map of the design.

In another embodiment, a computer program product which includes program code is described. The program code includes computer executable instructions configured for: modeling current steering amongst multiple parallel charge/discharge paths encountered in an integrated circuit design; using decision diagrams to account for switching constraints to correctly capture current paths and densities; computing currents to determine power dissipated by design elements contained within the integrated circuit design; and, performing a statistical interconnect and transistor reliability analysis based upon the current modeling and a thermal map of the design.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 3A, 3B and 3C, generally referred to as FIG. 3, show a channel connected region (CCR) template and corresponding decision diagrams.

DETAILED DESCRIPTION

Figure 1:
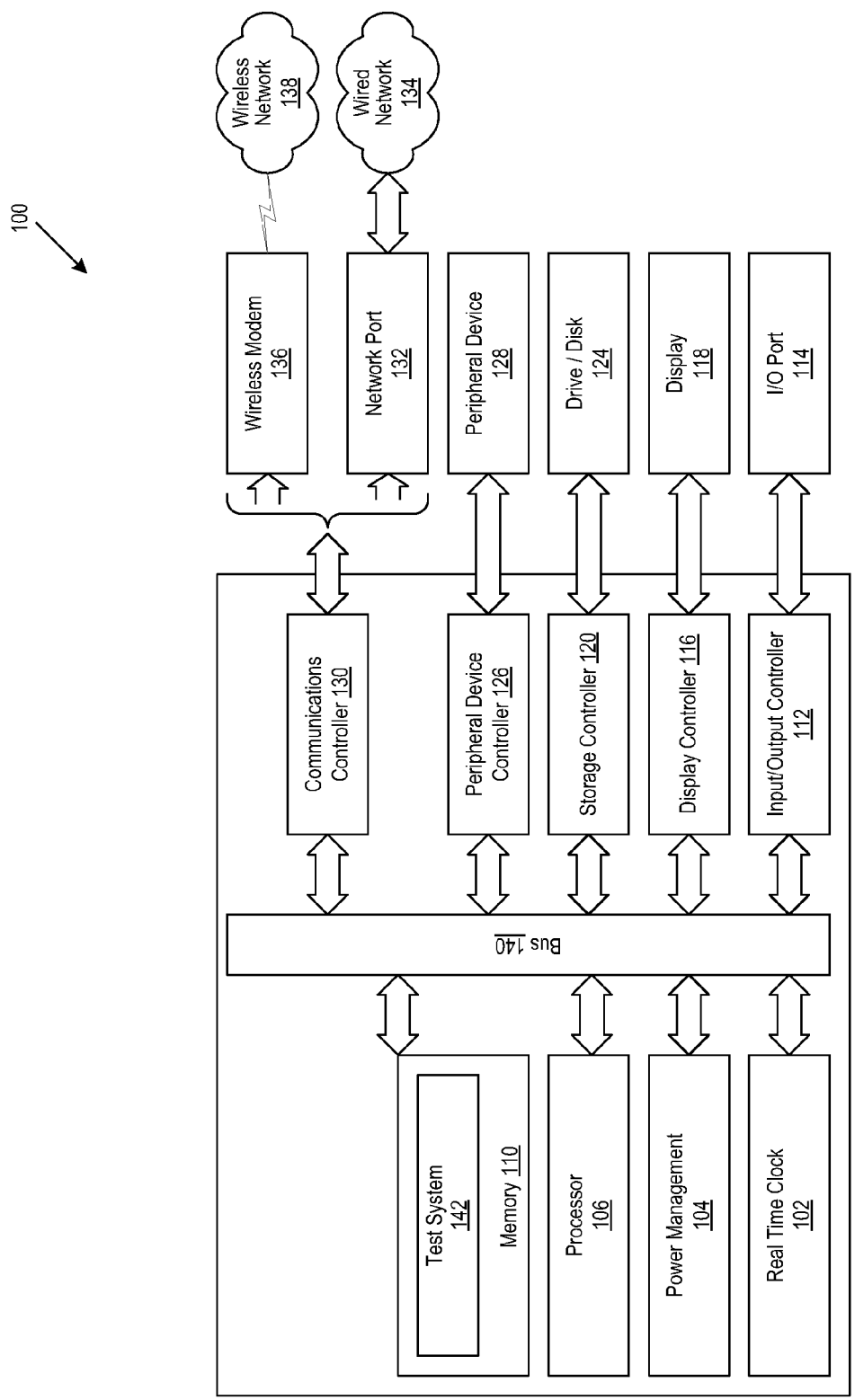
FIG. 1 shows a generalized block diagram of an information processing system as implemented in accordance with an embodiment of the invention.

A system and method are disclosed for performing interconnect and transistor reliability analysis for deep sub-micron integrated circuit designs. Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. Some portions of the detailed descriptions provided herein are presented in terms of algorithms and instructions that operate on data that is stored in a computer memory. Such descriptions and representations are used by those skilled in the art to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that, throughout the description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Of course, those skilled in the art will recognize many modifications may be made to this configuration without departing from the scope or spirit of the claimed subject matter.

FIG. 1 is a generalized block diagram illustrating an information processing system 100 as implemented in accordance with an embodiment of the invention. System 100 comprises a real-time clock 102, a power management module 104, a processor 106 and memory 110, all physically coupled via bus 140. In various embodiments, memory 110 comprises volatile random access memory (RAM), non-volatile read-only memory (ROM), non-volatile flash memory, or any combination thereof. In one embodiment, memory 110 also comprises test system 142.

Also physically coupled to bus 140 is an input/out (I/O) controller 112, further coupled to a plurality of I/O ports 114. In different embodiments, I/O port 114 may comprise a keyboard port, a mouse port, a parallel communications port, an RS-232 serial communications port, a gaming port, a universal serial bus (USB) port, an IEEE1394 (Firewire) port, or any combination thereof. Display controller 116 is likewise physically coupled to bus 140 and further coupled to display 118. In one embodiment, display 118 is separately coupled, such as a stand-alone, flat panel video monitor. In another embodiment, display 118 is directly coupled, such as a laptop computer screen, a tablet PC screen, or the screen of a personal digital assistant (PDA). Likewise physically coupled to bus 140 is storage controller 120 which is further coupled to mass storage devices such as a tape drive or hard disk 124. Peripheral device controller is also physically coupled to bus 140 and further coupled to peripheral device 128, such as a random array of independent disk (RAID) array or a storage area network (SAN).

In one embodiment, communications controller 130 is physically coupled to bus 140 and is further coupled to network port 132, which in turn couples the information processing system 100 to one or more physical networks 134, such as a local area network (LAN) based on the Ethernet standard. In other embodiments, network port 132 may comprise a digital subscriber line (DSL) modem, cable modem, or other broadband communications system operable to connect the information processing system 100 to network 134. In these embodiments, network 134 may comprise the public switched telephone network (PSTN), the public Internet, a corporate intranet, a virtual private network (VPN), or any combination of telecommunication technologies and protocols operable to establish a network connection for the exchange of information.

In another embodiment, communications controller 130 is likewise physically coupled to bus 140 and is further coupled to wireless modem 136, which in turn couples the information processing system 100 to one or more wireless networks 138. In one embodiment, wireless network 138 comprises a personal area network (PAN), based on technologies such as Bluetooth or Ultra Wideband (UWB). In another embodiment, wireless network 138 comprises a wireless local area network (WLAN), based on variations of the IEEE 802.11 specification, often referred to as WiFi. In yet another embodiment, wireless network 138 comprises a wireless wide area network (WWAN) based on an industry standard including two and a half generation (2.5G) wireless technologies such as global system for mobile communications (GPRS) and enhanced data rates for GSM evolution (EDGE). In other embodiments, wireless network 138 comprises WWANs based on existing third generation (3G) wireless technologies including universal mobile telecommunications system (UMTS) and wideband code division multiple access (W-CDMA). Other embodiments also comprise the implementation of other 3G technologies, including evolution-data optimized (EVDO), IEEE 802.16 (WiMAX), wireless broadband (WiBro), high-speed downlink packet access (HSDPA), high-speed uplink packet access (HSUPA), and emerging fourth generation (4G) wireless technologies.

The test system 142 enables an impedance-based static analysis to perform interconnect and transistor reliability analysis for deep sub-micron integrated circuit designs. The test system 142 accurately models current steering amongst multiple parallel charge/discharge paths encountered in custom circuit designs. In certain embodiments, the test system 142 further includes using decision diagrams to account for switching constraints, such as equivalence or exclusivity among nets, to correctly capture the current paths and densities. Computed currents are subsequently used to compute the power dissipated by the design elements. The power dissipated by the entire design is then computed by accounting for switching constraints such as one-hot, where only a single net out of a collection of nets is high at any given time.

Figure 2:
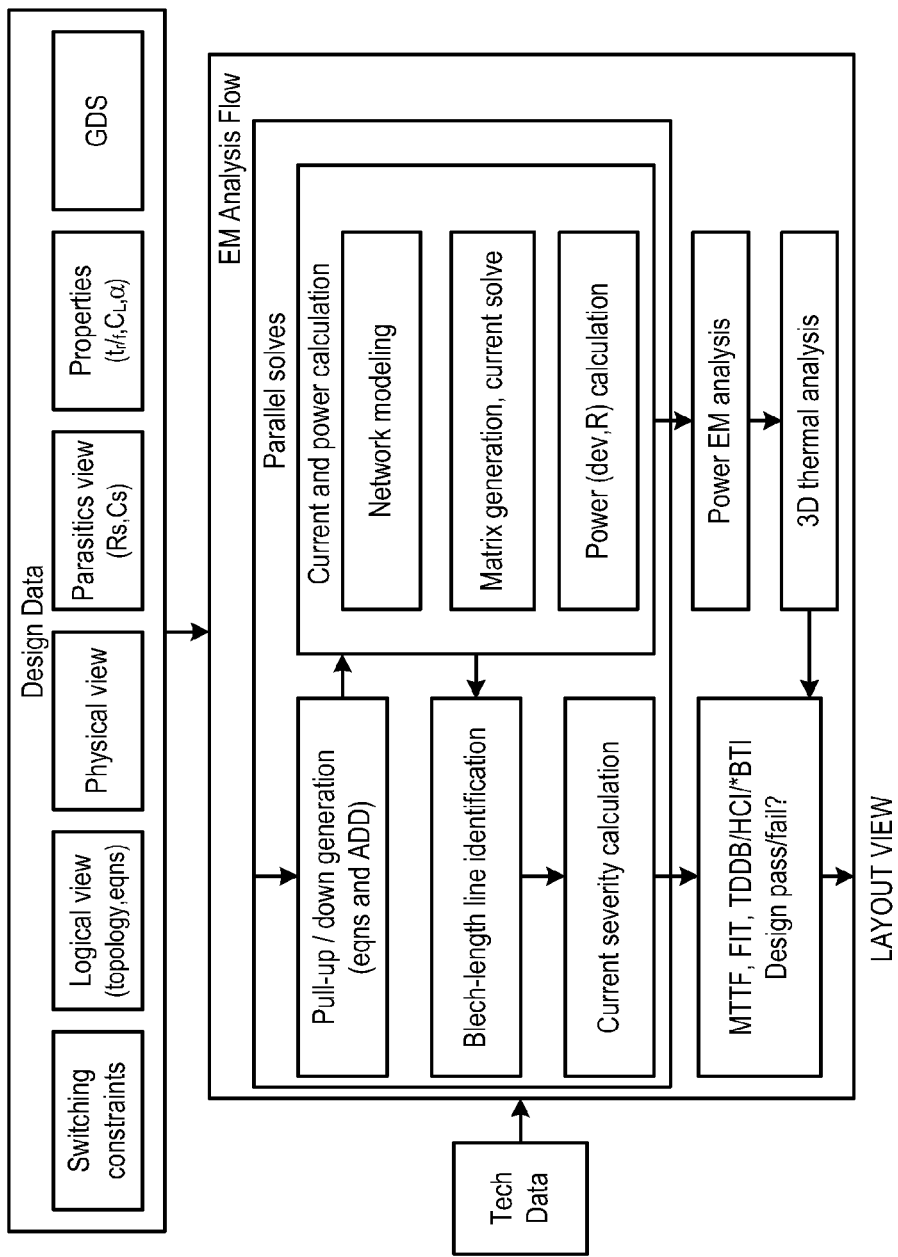
FIG. 2 shows a block diagram of an interconnect and transistor reliability analysis flow.

Referring to FIG. 2, a general diagram of the analysis flow is shown. This analysis flow targets full-custom IC designs. However, a simplified version of this flow could equally be applied to standard cell based designs.

The inputs to the tool include a parasitic view (DSPF file) back-annotated with physical layer information, logical and physical views (e.g., transistor netlists), switching constraints, properties such as edge rate, switching factor and capacitance load on the design, design layout (GDS or lef/def format) and a technology file describing process-specific parameters. Although the flow is used primarily for post-extraction data, results can be estimated pre-layout by replacing the DSPF file with estimated parasitic format (ESPF) data instead.

Based upon the topological connectivity in the netlist, and the power supplies specified in the techfile, the DSPF file is fractured into channel-connected regions (CCRs). The logical equations governing each CCR along with switching constraints are used to compute the pull up and pull down paths in the CCRs.

Next, the $I_{DC}$ and $I_{RMS}$ currents are calculated for each interconnect resistor. For each CCR, each parasitic capacitor (interconnect and device) is converted into a current source. Then, for each possible pull-up and pull-down path of the CCR, the on devices are replaced with equivalent on-resistances, and the matrix of the linear IR system is solved for each branch's (resistor) current. The worst-case $I_{DC}$, $I_{RMS}$ and power numbers are then calculated for each resistor and transistor from the output of the matrix solves.

DC current through power supply rails are then computed using the currents computed for the signal nets and the switching constraints on the signal nets. Blech-length line computation and subsequent current severity calculation are also performed.

Temperature is then estimated for each interconnect resistor and transistor using a full 3D thermal simulation. Power dissipation numbers for all the resistors and transistors in the design are applied as input to the thermal simulator that accounts for the self-heating of the interconnect resistors and transistors as well as adjacent neighbor contributions.

Next, the $I_{DC}$ and $\Delta T$ values for each resistor are passed into the SEB engine, and the FIT value for the design is calculated as the sum of the FIT values for each via/interconnect interface as well as negative width transistion locations, which are the physical locations of the defect failure caused by Electromigration.

The results generated by the analysis flow can be used to generate statistical information which can be visually displayed (i.e., presented) to a user. The statistical information can include reliability analysis information, defect failure analysis information as well as power consumption information (such as a thermal map of the integrated circuit design at a resolution of individual transistor finger as well as parasitic resistor and via in the integrated circuit design).

Referring to FIG. 3, the test system 142 performs a pull up pull down path generation operation. This operation identifies a set of paths in every CCR in the design under test that forces maximum current through every resistor and transistor in the design. The logical functionality of a CCR is typically represented as a Boolean relationship between the output of the circuit and its inputs. The functionality can also be represented in terms of relationship between the devices in the CCR and each output of the CCR. Such a representation can be used to efficiently solve for the objective since a path is represented by the devices in that path. Additionally, path results computed on a CCR can be applied to other CCRs with same topology and net connectivities to save runtime.

Boolean logic functions are defined in terms of the devices in a CCR. The ON set of an output net is defined in a sum-of-products fashion where the each product-term indicates the devices that need to be ON together and is represented as an array of length equal to the number of devices in the CCR.

A minterm is a product-term corresponding to a valid single path that connects the output net and the supply net. This minterm indicates the state of a device as either on or off or don't care. A path exists when all devices in that path are on. A subset of minterms can be combined to form implicants or cubes using a bitwise Boolean OR operation. The implicant is said to cover the included minterms and is considered to be larger than the minterms. A prime implicant is an implicant that cannot be combined with any other implicant or a minterm to form a larger implicant. An essential prime implicant is an implicant that exclusively covers a subset of the ON set.

The original objective of finding maximum currents through the individual resistors can be facilitated by finding the largest set of minterms and essential prime implicants that covers the ON set of the CCR outputs.

Referring to FIG. 4, the relationship between devices and an output net of a CCR can be represented in terms of a decision diagram (DD) where the nodes are represented by the devices in the CCR and the edges are representative of the source and drain connections between the devices. A solid line represents the path taken when a device is on and dotted-line represents the path taken when the device is off. A certain path from an output net to a supply net is said to be exercised if all the devices in that path are turned on.

The analysis flow gets the equations for a given CCR topology from a CCR template library, although a user can override the default path set for any given CCR. FIG. 3 shows the CCR template for a 2-1 AOI gate, its Boolean function and decision diagrams corresponding to the pull-up/-down paths. In the DD for the pull-up path, note that the solid line from M1 goes straight to M3 since M2 is a don't care when M1 is on.

Instances of a master CCR template can differ depending on the properties of their gate connectivity, such as exclusivity or equivalence among gate inputs, supply-tied gates, etc. For example, a 2-NAND device driven by equivalent gate inputs can function as an inverter. In addition, some of the devices in a CCR may serve as bleeder or feedback devices that may not participate in determining the logical function of the CCR. Instance specific DD can be obtained by enforcing the constraints on to the generic Boolean function.

Decision diagrams allow for efficient handling of the switching constraints to find CCR instance specific legal paths. The logical function corresponding to the CCR template is used to create the generic decision diagram composed of devices as nodes and their connectivity as edges. A minterm or a path in the decision diagram corresponds to a path between the CCR output and a supply rail. The user provided switching constraints on the nets are mapped onto the devices the nets drive, and another DD representing the constraints among the devices is created. Each minterm in the second DD represents a constraint where a subset of devices need to be either on or off together or exclusive of each other. A logical AND operation between the two decision diagrams results in the instance-specific DD.

Figure 4B:
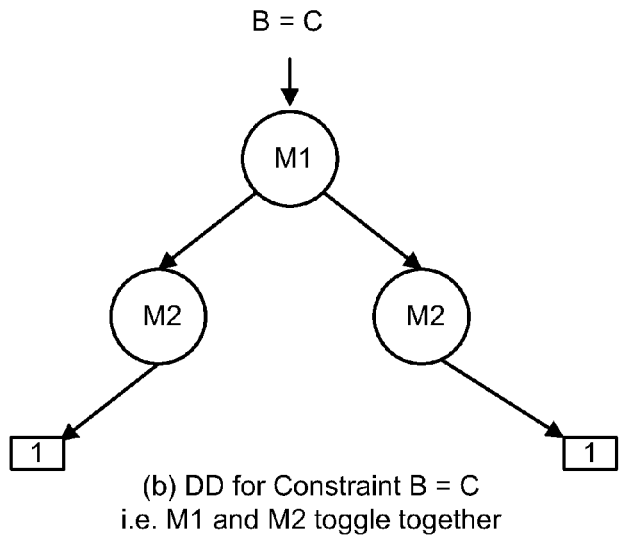
FIGS. 4A, 4B and 4C, generally referred to as FIG. 4, show a decision diagram (DD) based switching constraint handling.
Figure 4A:
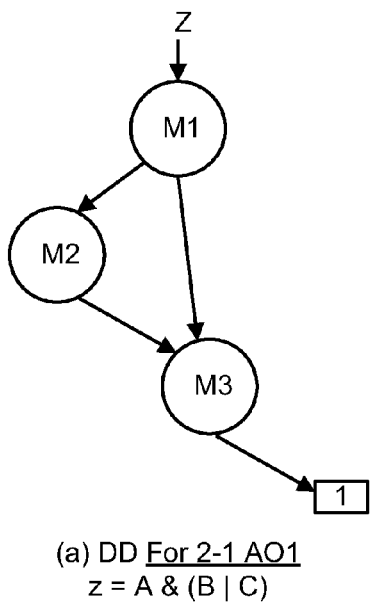
Figure 4C:
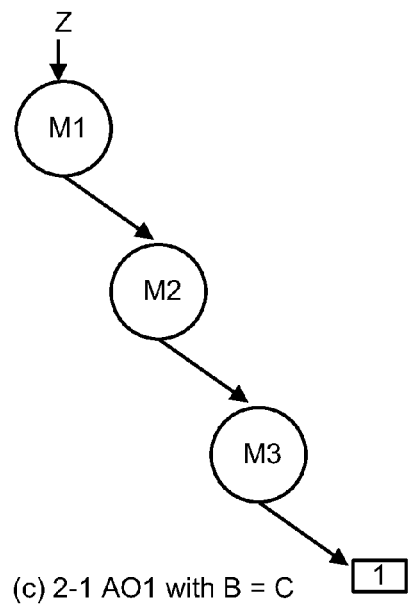

Referring to FIG. 4, a decision diagram (DD) based switching constraint handling is shown. More specifically, FIG. 4A shows the DD of the pull-up path corresponding to the CCR template, the 2-1 AOI shown in FIG. 3A. The equivalence constraint that forces B=C implies that devices M1 and M2 will be on or off together. The decision diagram corresponding to this switching constraint is shown in FIG. 4B. The two decision diagrams are ANDed to provide the decision diagram shown in FIG. 4C.

Figures 5A, 5B, 5C:
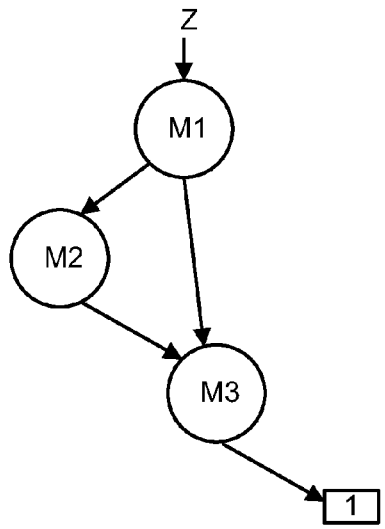
FIGS. 5A, 5B and 5C, generally referred to as FIG. 5, shows logical covering that maximizes currents through resistors.

FIGS. 5A, 5B and 5C, generally referred to as FIG. 5, shows logical covering that maximizes currents through resistors. When performing a logical covering operation, the implicants or cubes of the resultant decision diagram can represent one or more legal paths in the CCR. The logical covering algorithm maximizes the set of minterms and the essential prime implicants in the ON set.

Also, $S=\{S_1, S_2, \ldots S_i, \ldots S_m\}$ represent the set of product-terms defining the ON set of the CCR output obtained after applying the switching constraints. A product-term p covers another product-term q if p turns on (off) all the on (off) devices in q and also if p turns on/off equal or more number of devices than q. Thus, the subset of product-terms covered by a candidate product-term $S_i$ be $T=\{T_1, T_2, \ldots T_j, \ldots T_n\}$ where n<m.

Input to the logical covering operation is the ON set S. For a given product-term $(S_i)$ the set of product-terms (T) that $S_i$ covers is initially identified. If n=|T| is non-empty and if $S_i$ does not cover any additional minterm not covered by T then $S_i$ can be removed from the set S. The step is repeated until all product-terms are processed as candidates for removal from S. The resulting set S is the solution set of the logical covering operation.

FIG. 5A shows the DD of a 2-1 AOI with no constraint among the inputs or devices. The truth-table format of the DD is shown in FIG. 5B where the devices together represent a product-term. A 1(0) under a device M implies that the particular device is on (off). A 1 under the output Z implies that the particular state of the devices on the left defines a legal path from the output Z to the supply. Of these product-terms, the third product-term covers the first two product-terms and so is removed. The resulting solution set is shown in FIG. 5C.

A legal path can be realized from a product-term by turning on only the devices in state 1 and by turning off all the other devices. The maximum current through each resistor in the CCR can be obtained if each product-term in the solution set similar to the one in FIG. 5C is exercised exclusive of the other product-terms in the solution set.

The above results computed for a given CCR instance can be cached and applied to other CCRs with same topology, net connectivities and switching constraints.

Figure 6:
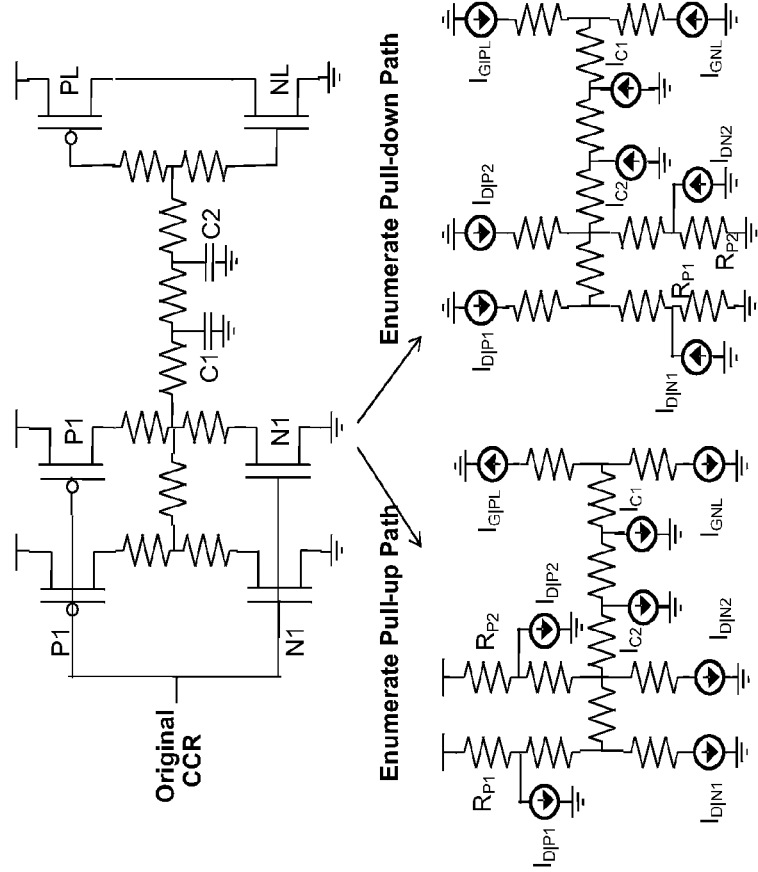
FIG. 6 shows a resistor capacitor (RC) network converted to a linear current and resistor (IR) system.

Referring to FIG. 6, a resistor capacitor (RC) network converted to a linear IR system is shown. Given the set of legal paths as explained in above, the static current calculation provides a calculation of worst case $I_{DC}$, $I_{RMS}$ in every interconnect segment and transistor in the CCR. For every legal path, the corresponding netlist and RC network is then devolved into a set of linear IR systems.

For each pull-up path, devices that are off are removed from the network, and devices that are on are replaced by equivalent on resistances inversely proportional to device width ($R_{P1}$, $R_{P2}$). Each parasitic interconnect capacitor (C1, C2) is replaced with a current source calculated as $I=C\cdot\Delta V\cdot f$. Each diffusion ($C_{D|P1}$, $C_{D|P2}$) and gate ($C_{G|PL}$, $C_{G|NL}$) device parasitic capacitance on the CCR is linearized and similarly replaced with a current source. The voltage swing, $\Delta V$, which defaults to $V_{DD}$, can be explicitly set on a per-net basis to more accurately model those nets that do not swing full rail. All pull-down paths are similarly enumerated, and the polarity of the current sources is reversed.

The activity factor is set to one for this operation, so that the same set of matrix solves can be used to calculate both DC and RMS currents.

For each pull-up/down path, the linear IR system is solved to find the current in each resistor. Absolute current polarity is not important, but relative polarity is so that all the solution results can be analyzed to calculate the following four current values for each interconnect resistor:

$I_{FWD|MAX}$: Maximum positive (forward) current.
$I_{FWD|MIN}$: Minimum positive (forward) current.
$I_{REV|MAX}$: Maximum negative (reverse) current.
$I_{REV|MIN}$: Minimum negative (reverse) current.

For the simple example in FIG. 6, $I_{FWD|MAX}=I_{FWD|MIN}$, and $I_{REV|MAX}=I_{REV|MIN}$, but for more complex CCRs, these values will diverge. The final resistor $I_{DC}$ is:

$$I_{DC}=\alpha\cdot\text{Max}(I_{FWD|MAX}-\rho\cdot I_{REV|MIN}, I_{REV|MAX}-\rho\cdot I_{FWD|MIN}) \quad (1)$$

where $\rho$ is the recovery coefficient (~0.9 for copper), and $\alpha$ is the activity factor of the CCR.

With the simplifying assumption that the current waveform is triangular in shape, where the peak positive (negative) current is $I_{PEAKF}$ ($I_{PEAKR}$), the width of the triangular waveform is equal to the CCR output rise/fall time ($t_R$), and T is the period of integration, $I_{RMS}$ can now be derived:

$$I_{RMS} = \sqrt{\frac{1}{T}\int_0^T I(t)^2 dt} = \sqrt{\frac{t_r}{3\cdot T}\cdot(I_{PEAKF}^2 + I_{PEAKR}^2)} \quad (2)$$

$I_{PEAKF}$ ($I_{PEAKR}$) can now be related back to the normalized current $I_{FWD|MAX}$ ($I_{REV|MAX}$) since $I_{PEAKF}=2\cdot I_{FWD|MAX}/f_{CLK}\cdot t_R$, and T can be replaced with $\alpha$ and the clock frequency ($f_{CLK}$) since $T=1/\alpha\cdot f_{CLK}$, so that $I_{RMS}$ can reuse the original matrix results used for the DC current calculations:

$$I_{RMS} = \sqrt{\frac{4\cdot\alpha}{3\cdot f_{CLK}\cdot t_R}\cdot(I_{FWD|MAX}^2 + I_{REV|MAX}^2)} \quad (3)$$

At the completion of this operation, each interconnect segment (resistor) has its DC and RMS currents fully and accurately characterized.

The power dissipated by the design is computed in a bottom-up manner starting with all the resistors and devices in the design. The CCR-level power is then computed by selecting pull-up and pull-down paths most likely to cause high temperatures. The design-level power is computed by summing the CCR-level power numbers after accounting for switching constraints.

The power dissipated in an interconnect resistor is computed using its $I_{RMS}$ and resistance as $$P_{res}=I_{RMS}^2 * R \quad (4)$$

The transistor power is computed as follows. During the pull-up operation, the total power drawn by the CCR is $\alpha\cdot C\cdot V^2\cdot f$, of which $P_{cap\_up}=(\alpha\cdot C\cdot V^2\cdot f)/2$ is stored in the capacitors, and $P_{res\_up}$ is dissipated in the resistors. The power dissipated by the transistors in the pull-up path is then computed as $$P_{transistor\_up} = \alpha \cdot C \cdot V^2 \cdot f - P_{cap\_up} - P_{res\_up} \quad (5)$$

Here, $P_{res\_up}$ is computed using only the pull-up RMS current ($I_{PEAKR}=0$). Similarly, $P_{res\_down}$ can be computed using only the pull-down RMS current ($I_{PEAKF}=0$). During the pull-down operation, the power stored in the capacitors is dissipated through the resistors ($P_{res\_down}$) and through the transistors in the pull-down path. The pull-down transistor power is then given as $$P_{transistor\_down} = P_{cap\_down} - P_{res\_down} \quad (6)$$

The power consumed by individual transistors in the path can be obtained by distributing the total power proportional to the area of the transistors. Finally, the total transistor power is then computed as $$P_{transistor} = P_{transistor\_up} + P_{transistor\_down} \quad (7)$$

The power dissipated by any legal path in the design is then given as $$P_{path} = \sum_{e=1}^{|path|} P_e \quad (8)$$

where Pe is the power dissipated by an element e in the path. The power of every pull-up/-down path in the design can thus be computed. A CCR can contain multiple outputs as well as multiple paths for which the power dissipation numbers can be computed. Since these paths can have equal probability of being activated, summing the power numbers due to all the paths will result in power values larger than the maximum power that can be dissipated in the CCR.

For an output net with multiple paths, activating only one of the pull-up paths and only one of the pull-down paths alternately will lead to the correct temperature on the CCR. In addition, picking the paths with maximum power densities will also help find the maximum temperature. The power dissipated by the output net of a CCR is then given as $$P_{out\_net} = \max_{l=1 \text{ to } |u|}(P_l) + \max_{m=1 \text{ to } |d|}(P_m) \quad (9)$$

where $P_l$ is the power of a pull-up path l that connects out_net to a power net and $P_m$ is the power of a pull-up path m that connects out_net to low-voltage (ground) net.

Design net-level constraints such as one-hot, zero-hot, one-cold, and zero-cold can impose restrictions on the number of nets that can be high or low at any given time. For example, given a set of nets with one-hot constraint applied on them, only one of the nets can be turning high at any given time. Blindly summing the power numbers of the nets in a constraint set can result in a design-level power number that is higher than the maximum power the design can dissipate. Among the nets in a constraint set, in the worst case, one net can be pulling up while another net is pulling down. In addition, continuous toggling of the very same two nets in the given constraint set can result in maximum temperature than possible with any other combination of net toggling in the constraint set.

For each constraint set, two nets dissipating the maximum power are selected. The power for the entire design can therefore be given as $$P_{design} = \sum_{i=1}^{|UC|} P_i + \sum_{j=1}^{|C|} [P_{j,max1} + P_{j,max2}] \quad (10)$$

where $P_{design}$ is the design power, unconstrained set UC is the set of CCR output nets that do not belong to any constraint set and C is the collection of constraint sets. Also, $P_i$ is the power of a CCR output net i that belongs to UC. $P_{j,max1}$ is the maximum power among output nets in a constraint set j in C and $P_{j,max2}$ is the second maximum power among all the output nets in the constraint set j in C.

After the currents through the signal nets and transistors are computed, the currents through the power rails are computed as a superposition of the currents through the transistors connected to the power rails. The switching constraints on the nets need to be accounted for when computing the currents through the rails. For example, nets that are included in a one-hot constraint set will not be active together and hence the current through a power rail resistor will be the maximum current drawn by any of the nets in the constraint set. The current through a power rail resistor is then given as $$I_{DC\_rail} = \sum_{i=1}^{n} I_{DC\_NC}(i) + \sum_{j=1}^{m} \text{MAX}(I_{DC\_C}(j)) \quad (11)$$

where $I_{DC\_NC}(i)$ refers to the current through a supply connected transistor with no constraints, and $I_{DC\_C}(j)$ refers to supply connected transistors belonging to a constraint set 'j'. The RMS currents and power on the power rail resistors can be computed in a similar manner.

Short metal lines, also referred to as Blech lines can often have larger mean time to failure MTF compared to their longer counterparts. The metal segments between vias may be represented as a distributed RC network. Because the vias contain barrier layers that prevent metal atom flow through them, the RC network should be traced between vias to identify resistors belonging to the same metal segment.

The operation for collecting metal segments uses a graph containing resistors representing metals and vias in the design. The operation starts from a random resistor and performs a depth-first search through the resistor network. A recursive search terminates when a via is encountered. When the search cannot progress in anymore, the resistors collected so far constitute a metal segment. The length and width of the metal segments are then compared with the threshold on the length and width of the short line to identify the Blech-lines.

Once the Blech-lines are identified, the severity of the currents computed so far can be computed using predefined limits provided in a technology file. The technology file represents these current limits as a function of several parameters such as lifetime of the product, width of the metal resistor etc. These current limits are specified in the form of equations that are evaluated on the fly by the analysis engine using appropriate parameter values. In addition, the DC current limits may be higher for Blech-lines.

The power computed can be used to perform a thermal analysis on the design. By keeping track of the power applied on the resistors and transistors in the design, it is possible to accurately capture the temperature gradient down to the resolution of interconnect metals, vias and device fingers.

Heat flow in solid structures can be written for steady-state conditions as a function of location r as $$\nabla \cdot (k \nabla T(r)) + g(r) = 0 \quad (12)$$

where T is the temperature, k is the thermal conductivity of the material (W/m/K), and g is the heat generation rate per unit volume (W/m³). The boundary condition for the heat flow equation can be given as $$k\frac{\partial T}{\partial n_i} + h_i T = f_i \tag{13}$$

where $h_i$ is the heat transfer coefficient (W/m² K), $n_i$ is the normal vector drawn outward from the boundary surface (S), and $f_i$ is an arbitrary function of space.

Figure 7:
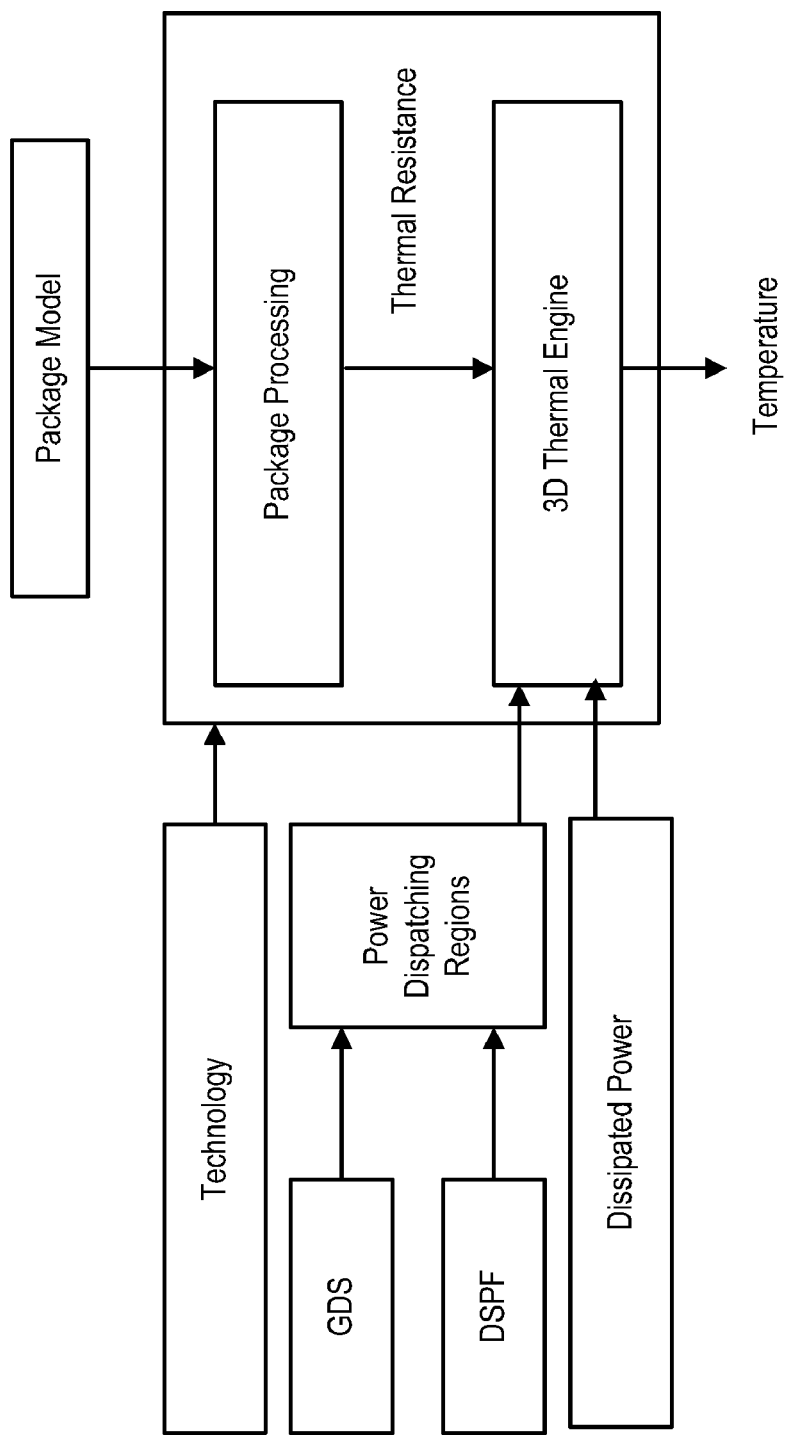
FIG. 7 shows a block diagram of a thermal analysis system.

The thermal analysis methodology is shown in FIG. 7. Initially, the package boundary condition is resolved using commercially available model and a package processing tool such as the Flomerics model and package processing tool available from Flometric, Inc. A reduced package model is obtained via the tool which includes resistances on each side of the die, to model the conduction of heat flow out of the die.

Other inputs to the 3D thermal engine can include the layout in graphic database system GDS or as a combination of library design exchange format (LEF) and design exchange format (DEF) in addition to a detailed standard parasitic format (DSPF) data, and technology data. Technology data includes parameters such as thickness, mask layer information and material properties including thermal conductivities. The GDS and DSPF data are used to identify the power dissipating regions such as interconnect resistors and transistors in the design.

The candidate design is analyzed either using reflective boundary condition that assumes the design to be replicated in a tiled fashion. It is also possible to analyze the design by placing the design in its exact location in the floorplan to account for real neighbor thermal interaction.

The design-level power estimated is then imposed on the design layout such that every interconnect resistor and transistor in the design is converted into a power source. The 3D thermal engine then computes a high resolution temperature map of the design.

Although the power estimation using switching constraints operation handled switching constraints by assuming that only two nets in each constraint set are active, it is also possible to apply super position principle to more accurately compute the temperatures. In this approach, the thermal map of the design using only the nets that do not belong to any constraint set is initially computed and stored as the based solution. Constraint sets are then handled one at a time and the thermal maps for different combinations inside each constraint set are simulated. The complete thermal map is constructed by summing the maximum thermal map from each constraint set to the base solution.

The 3D thermal estimation step provides temperature for every interconnect resistor and transistor in the design and can be used to perform a high resolution reliability analysis of the design.

Figure 8:
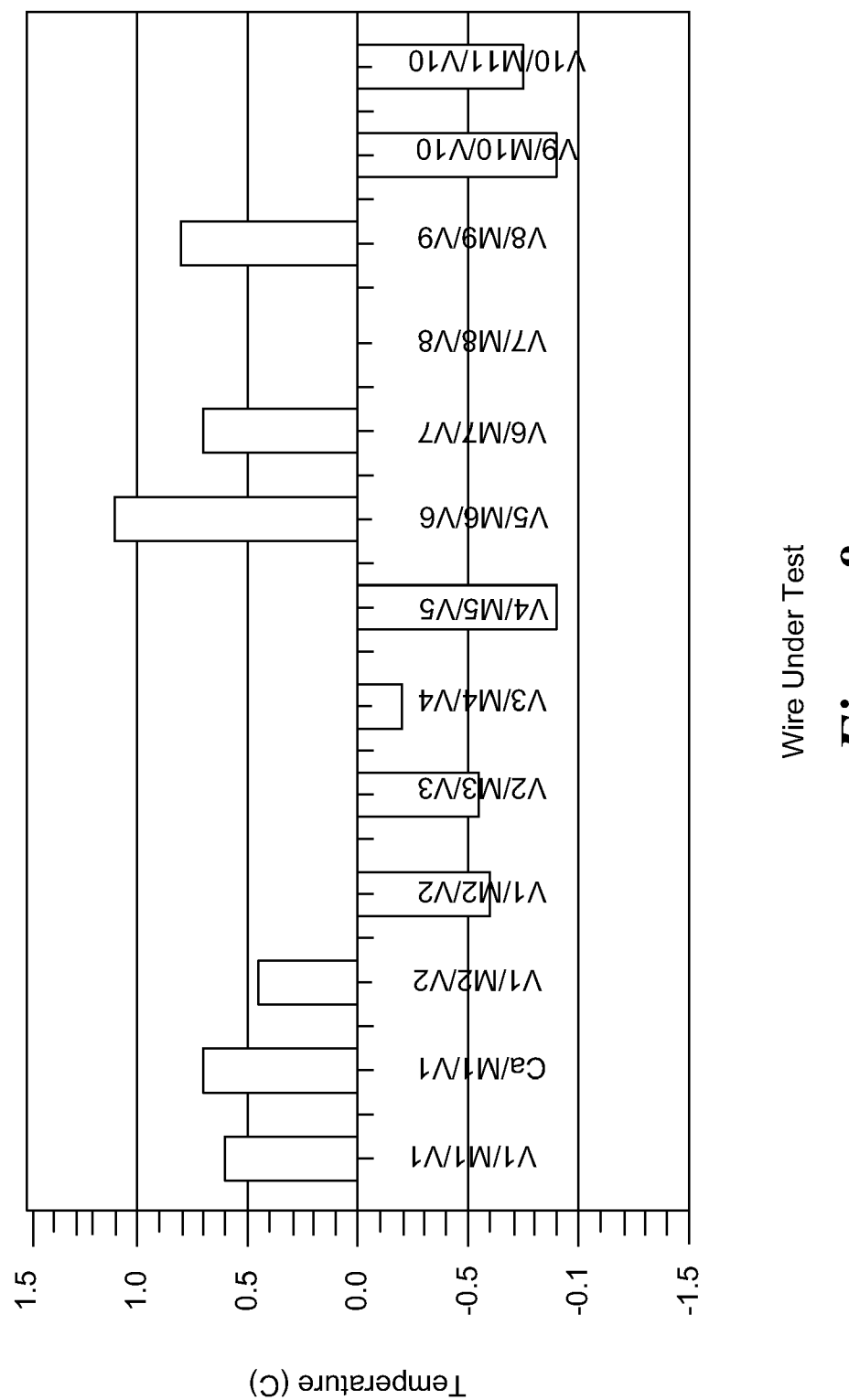
FIG. 8 shows a bar chart of a silicon validation of a 3 dimensional thermal flow.

The 3D thermal flow and the tool can be validated using silicon electromigration (EM) test structures. These test structures enable measurement of temperature on interconnect. The error can then be compared between the measured and simulated temperatures under the same input stimulus and boundary conditions. FIG. 8 shows the error in the estimation of interconnect temperatures by the 3D thermal methodology. Each triplet $V_x/M_{x+1}/V_{x+1}$ is a long $M_{x+1}$ metal structure connected to vias on both ends. It can be seen that the maximum error is only about 1° C.

The test system 142 also calculates a chip failure rate from $I_{DC}$ and $\Delta T$ of design elements. For example, the system calculates a failure rate of parasitic resistors. Assuming a log normal failure distribution, the probability of failure of a single interconnect interface is:

$$P_{FAILi} = \Phi\left(\frac{\ln(S_{DC}^n \cdot (T_{LIFE}/T_{50}(T_i)))}{\sigma}\right) \tag{14}$$

where $\Phi$ is the standard normal cumulative distribution function, $S_{DC}$ is the ratio $I_{DC}/I_{DC|LIMIT}$, n is a weighting exponent, $T_{LIFE}$ is the target product lifetime, $T_{50}(T_i)$ is the half-life for wire failure at the metal temperature $(T_i)$, and $\sigma$ is standard deviation of the distribution. $T_{50}$ is typically characterized at junction temperature, $T_J$. The parameters n, $T_{50}(T_J)$, and $\sigma$ are all derived from measured process data.

Assuming that a single EM failure will cause a chip failure, the combined probability of a chip failure can be expressed as:

$$P_{FAIL|CHIP} = 1 - \prod_{i=1}^{N}(1 - P_{FAILi}) \tag{15}$$

which can be algebraically rearranged as:

$$\ln(1 - P_{FAIL|CHIP}) = \ln\left[\prod_{i=1}^{N}(1 - P_{FAILi})\right] = \sum_{i=1}^{N}\ln(1 - P_{FAILi}) \tag{16}$$

Next, with the approximation that $\ln(1-x)=-x$ for $x \ll 1$, the total chip failure probability reduces to a sum of individual failure probabilities:

$$P_{FAIL|CHIP} = \sum_{i=1}^{N}-\ln(1 - P_{FAILi}) = \sum_{i=1}^{N}P_{FAILi} \tag{17}$$

A commonly used reliability term is FIT, which is one failure per $10^9$ product hours. A value of 1 FIT roughly corresponds to 1 part in 1000 failing after 10 years, and is related to failure probability as:

$$FIT_{CHIP} = \frac{10^9 \text{ hr.}}{T_{LIFE}} \cdot P_{FAIL|CHIP} = \frac{10^9 \text{ hr.}}{T_{LIFE}} \cdot \sum_{i=1}^{N}-\ln(1 - P_{FAILi}) \tag{18}$$

The standard normal cumulative distribution function can be expressed as:

$$\Phi(x) = \frac{\text{erf}(x/\sqrt{2}) + 1}{2} \tag{19}$$

so that the FIT contribution of a single interconnect interface (FIT) can be analytically calculated as:

$$FIT_i = -\frac{10^9 \text{ hr.}}{T_{LIFE}} \cdot \ln\left(\frac{1}{2} - \frac{1}{2} \cdot \text{erf}\left(\frac{\ln(S_{DC}^n(T_{LIFE}/T_{50}(T_i)))}{\sigma \cdot \sqrt{2}}\right)\right) \quad (20)$$

Since erfc(x)=1−erf(x) provides improved numerical stability for small x, the final equation used:

$$FIT_i = -\frac{10^9 \text{ hr.}}{T_{LIFE}} \cdot \ln\left(\frac{1}{2} \cdot \text{erfc}\left(\frac{\ln(S_{DC}^n(T_{LIFE}/T_{50}(T_i)))}{\sigma \cdot \sqrt{2}}\right)\right) \quad (21)$$

The relationship between temperature (in Kelvin) and $T_{50}$ is known via Black's equation:

$$T_{50}(T_i) = A \cdot j_{DC}^{-n} \cdot \exp\left(\frac{E_A}{k_B \cdot T_i}\right) \quad (22)$$

where A is a process-dependent constant, $j_{DC}$ is the DC current density, $E_A$ is the activation energy, and $k_B$ is Boltzmann's constant. To reduce the amount of data to be collected from the fab, only $T_{50}(T_J)$ is derived from measured process data. The analysis flow can then calculate $T_{50}(T_i)$ as:

$$T_{50}(T_i) = T_{50}(T_J) \cdot \exp\left[\frac{E_A}{k_B}\left(\frac{1}{T_i} - \frac{1}{T_J}\right)\right] \quad (23)$$

Thus, by utilizing the above equation, the mean time to failure of every resistor segment can be calculated.

The system also performs a time dependent dielectric breakdown (TDDB) analysis. TDDB is the wearing out of the silicon dioxide in the gate, leading to the formation of a conducting path through the oxide to the substrate. With a conducting path between the gate and the substrate, it is no longer possible to control current flow between the drain and source by means of the gate electric field.

TDDB is strongly affected by the number of defects in the gate oxide produced during wafer fabrication.

The degradation rate for the transistor can be given as:

$$t_{tddb} = t_{10} \cdot \exp\left(\frac{E_A}{k_B \cdot T}\right)\exp(-\gamma Eox) \quad (24)$$

where $E_A$ is the activation energy, $t_{10}$ is a constant, T is the temperature, Eox is the stress field in the oxide, and γ is the voltage acceleration factor.

Assuming a Weibull distribution [21] for the failure mechanism of transistors, the lifetime of the transistor can be given as $$\tau = c \cdot t_{tddb} \cdot [\ln(1-F)]^{1/\beta} \quad (25)$$

where F is the failure distribution function and β is the Weibull slope. For a target lifetime of the transistor, the probability of failure can be computed using equations (24) and (25). The failure in trillion hours (FIT) due to device TDDB can be computed similar to that of interconnect using equation (18).

The total FIT for the design is computed as the sum of FIT due to both interconnects and transistors. To accelerate design time, a central database recorded the FIT value for all blocks, and maintained a running total of chip FIT rate. Each block was given a pre-budgeted FIT value to target (FIT/N blocks), but the central database enabled FIT-swapping so blocks that did not need their full budgeted FIT value could give some or all to other blocks to speed-up EM closure.

Another aspect of the reliability analysis relates to a hot carrier injection (HCI) effect which may be caused due to high bias between the drain and source. High lateral fields create electron-hole pairs that are capable of generating more of the same kind Some of these carriers get trapped in the gate oxide or the SiO2 interface causing degradation in saturation current of the transistors. Higher temperature results in higher kinetic energy of the carriers and hence higher degradation in the saturation current. The HCI effect can be captured using the following equation $$\frac{\Delta I_{dsat}}{I_{dsat}} = fn(L, V_{DS}, T, t) \quad (26)$$

where Idsat is the saturation current, L is the transistor length, VDS is the drain to source voltage, T is the transistor temperature and t is the transistor stress time.

Another aspect of the reliability analysis relates to bias temperature instability (BTI) which is caused due to transistor interface traps and results in changes to the threshold voltage of these transistors. The interface traps are believed to be the result of hole assisted electro-chemical reaction and subsequent Si—H bond disassociation. BTI effects can be captured using the equation $$\Delta V_T = fn(L, W, V_g, T_{ox}, T, t) \quad (27)$$

where L and W are the length and width of the transistor, Vg is the gate voltage, Tox is the gate oxide thickness, T is the transistor temperature, and 't' is the transistor stress time.

Skilled practitioners in the art will recognize that many other embodiments and variations of the present invention are possible. In addition, each of the referenced components in this embodiment of the invention may be comprised of a plurality of components, each interacting with the other in a distributed environment. Furthermore, other embodiments of the invention may expand on the referenced embodiment to extend the scale and reach of the system's implementation.

What is claimed is:

1. A method for performing interconnect and transistor analysis comprising:
   modeling, via an information processing system, current steering amongst multiple parallel charge/discharge paths encountered in an integrated circuit design;
   using decision diagrams to account for switching constraints to correctly capture current paths and densities;
   computing, via the information processing system, currents to determine power dissipated by design elements contained within the integrated circuit design;
   performing, via the information processing system, a statistical interconnect and transistor based upon the current modeling and a statistical analysis of the design; and
   generating a thermal map of the integrated circuit design at a resolution of individual transistor finger as well as parasitic resistor and via in the integrated circuit design.

2. The method of claim 1, wherein
   the switching constraints represent any relation between nets in the integrated circuit, the relation between the nets comprising at least one of: an equivalence among nets of the integrated circuit design, exclusivity among nets of the integrated circuit design, and one-hot, one-cold, zero-hot or zero-cold constraints among the nets of the integrated circuit design.

3. The method of claim 1, wherein
the computing currents comprises performing a current calculation on power rails of the integrated circuit design, the current calculation on power rails accounting for switching constraints between the nets driven by respective devices of the integrated circuit design.

4. The method of claim 3, further comprising:
computing currents through the power rails and power dissipated by the power rails by utilizing currents on devices directly connected to respective power rails.

5. The method of claim 1, further comprising:
computing power dissipated by an entire integrated circuit design using switching constraints between nets in the integrated circuit design.

6. An apparatus comprising:
a processor;
memory coupled to the processor, the memory comprising a system for performing an interconnect and transistor reliability analysis, the system comprising instructions executable by the processor for:
  modeling current steering amongst multiple parallel charge/discharge paths encountered in an integrated circuit design;
  using decision diagrams to account for switching constraints to correctly capture current paths and densities;
  computing currents to determine power dissipated by design elements contained within the integrated circuit design;
  performing a statistical interconnect and transistor reliability analysis based upon the current modeling and a statistical analysis of the design; and,
  generating a thermal map of the integrated circuit design at a resolution of individual transistor finger as well as parasitic resistor and via in the integrated circuit design.

7. The apparatus of claim 6, wherein
the switching constraints represent any relation between nets in the integrated circuit, the relation between the nets comprising at least one of: an equivalence among nets of the integrated circuit design, exclusivity among nets of the integrated circuit design, and one-hot, one-cold, zero-hot or zero-cold constraints among the nets of the integrated circuit design.

8. The apparatus of claim 6, wherein
the computing currents comprises performing a current calculation on power rails of the integrated circuit design, the current calculation on power rails accounting for switching constraints between the nets driven by respective devices of the integrated circuit design.

9. The apparatus of claim 8, wherein the system further comprises instructions for:
computing currents through the power rails and power dissipated by the power rails by utilizing currents on devices directly connected to respective power rails.

10. The apparatus of claim 6, wherein the system further comprises instructions for:
computing power dissipated by an entire integrated circuit design using switching constraints between nets in the integrated circuit design.

11. A non-transitory computer readable storage device storing a computer program product comprising program code, the program code comprising computer executable instructions configured for:
  modeling current steering amongst multiple parallel charge/discharge paths encountered in an integrated circuit design;
  using decision diagrams to account for switching constraints to correctly capture current paths and densities;
  computing currents to determine power dissipated by design elements contained within the integrated circuit design;
  performing a statistical interconnect and transistor based upon the current modeling and a statistical analysis of the design; and,
  generating a thermal map of the integrated circuit design at a highest resolution of individual transistor finger as well as parasitic resistor and via in the integrated circuit design.

12. The computer program product of claim 11, wherein
the switching constraints represent any relation between nets in the integrated circuit, the relation between the nets comprising at least one of: an equivalence among nets of the integrated circuit design, exclusivity among nets of the integrated circuit design, and one-hot, one-cold, zero-hot or zero-cold constraints among the nets of the integrated circuit design.

13. The computer program product of claim 11, wherein
the computing currents comprises performing a current calculation on power rails of the integrated circuit design, the current calculation on power rails accounting for switching constraints between the nets driven by respective devices of the integrated circuit design.

14. The computer program product of claim 13, wherein the program code further comprises instructions configured for comprising:
computing currents through the power rails and power dissipated by the power rails by utilizing currents on devices directly connected to respective power rails.

15. The computer program product of claim 11, wherein the program code further comprises instructions configured for comprising:
computing power dissipated by an entire integrated circuit design using switching constraints between nets in the integrated circuit design.

16. A method for displaying a visual representation of an interconnect and transistor analysis comprising:
  modeling, via an information processing system, current steering amongst multiple parallel charge/discharge paths encountered in an integrated circuit design;
  using decision diagrams to account for switching constraints to correctly capture current paths and densities;
  computing, via the information processing system, currents to determine power dissipated by design elements contained within the integrated circuit design;
  performing, via the information processing system, a statistical interconnect and transistor based upon the current modeling and a statistical analysis of the design;
  presenting the visual representation of the interconnect and transistor analysis of the integrated circuit design; and,
  generating a thermal map of the integrated circuit design at a resolution of individual transistor finger as well as parasitic resistor and via in the integrated circuit design.

17. The method of claim 16, further comprising:
computing power dissipated by an entire integrated circuit design using switching constraints between nets in the integrated circuit design.

* * * * *